US010228489B2

United States Patent
Yan et al.

(10) Patent No.: US 10,228,489 B2
(45) Date of Patent: Mar. 12, 2019

(54) METHOD FOR DETECTING GLACIER MELTING BASED ON TRACER TECHNOLOGY

(71) Applicant: China Institute of Water Resources and Hydropower Research, Beijing (CN)

(72) Inventors: Denghua Yan, Beijing (CN); Hao Wang, Beijing (CN); Baisha Weng, Beijing (CN); Tianling Qin, Beijing (CN); Wanli Shi, Beijing (CN); Guoqiang Dong, Beijing (CN); Xinlei Guo, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 0 days.

(21) Appl. No.: 15/760,624

(22) PCT Filed: Aug. 8, 2017

(86) PCT No.: PCT/CN2017/096418
§ 371 (c)(1),
(2) Date: Mar. 15, 2018

(87) PCT Pub. No.: WO2018/028564
PCT Pub. Date: Feb. 15, 2018

(65) Prior Publication Data
US 2018/0275311 A1   Sep. 27, 2018

(30) Foreign Application Priority Data
Aug. 12, 2016 (CN) .......................... 2016 1 0665895

(51) Int. Cl.
*G01V 11/00* (2006.01)
*G01V 9/00* (2006.01)
(Continued)

(52) U.S. Cl.
CPC ............. *G01V 11/00* (2013.01); *G01D 21/02* (2013.01); *G01V 9/00* (2013.01); *G01V 99/005* (2013.01)

(58) Field of Classification Search
CPC ....... G01V 11/00; G01V 99/005; G01D 21/02
See application file for complete search history.

(56) References Cited

U.S. PATENT DOCUMENTS 3,151,246 A * 9/1964 Mardock ............. E21B 47/1015
250/303
2014/0153835 A1   6/2014 Pritt

FOREIGN PATENT DOCUMENTS

CN   201277963 Y   7/2009
CN   104237080 A   12/2014
(Continued)

OTHER PUBLICATIONS

David G. Williams, Tracing Glacial Ice and Snow Meltwater With Isotopes, WRP final report, May 1, 2009. (Year: 2009).*
(Continued)

*Primary Examiner* — Paul D Lee
*Assistant Examiner* — Mark I Crohn
(74) *Attorney, Agent, or Firm* — Gokalp Bayramoglu

(57) ABSTRACT

The present invention discloses a method for detecting glacier melting based on tracer technology. The method includes the following steps. 1. Different tracer agents with equal concentration are respectively added into a plurality of water samples. The water sample and the tracer agents are mixed well. Meanwhile, the volume and the mass of each glacier model are recorded. A plurality of water samples added with tracer agents are frozen layer by layer from inside to outside to establish a plurality of glacier models. 2. The surrounding environmental factors of the glacier model are adjusted. Water samples of the glacier models melted under different environmental factor conditions are col-
(Continued)

lected. Furthermore, the concentrations of different kinds of tracer agents in the water samples are measured.

5 Claims, 1 Drawing Sheet

(51) Int. Cl.
*G01V 99/00* (2009.01)
*G01D 21/02* (2006.01)

(56) References Cited

FOREIGN PATENT DOCUMENTS

| CN | 105607100 A | 5/2016 |
|---|---|---|
| CN | 106323374 A | 1/2017 |

OTHER PUBLICATIONS

D. Penna et al., Tracer-based analysis of spatial and temporal variations of water sources in a glacierized catchment, Hydrol. Earth Syst. Sci., 18, 5271-5288, 2014. (Year: 2014).*

H. Behrens et al., Study of the discharge of Alpine glaciers by means of environmental isotopes and dye tracers, Snow and Ice-Symposium-Neiges et Glaces (Proceedings of the Moscow Symposium, Aug. 1971; Actes du Colloque de Moscou, aout 1971): IAHS-AISH Pub!. No. 104, 1975. (Year: 1975).*

Andrew C. Mitchell et al., Minor and trace elements as indicators of solute provenance and flow routing in a subglacial hydrological system, Hydrol. Process. 20, 877-897 (2006). (Year: 2006).*

Andrew C. Mitchell et al., Minor and trace elements as indicators of solute provenance and flow routing in a subglacial hydrological system, hydrological processes, Dec. 31, 2016, p. 877-897.

Wenwu Qing et al., Progress in study of glacier hydrological model, Advances in water science, Nov. 30, 2018, p. 393-902, vol. 19, No. 6.

* cited by examiner

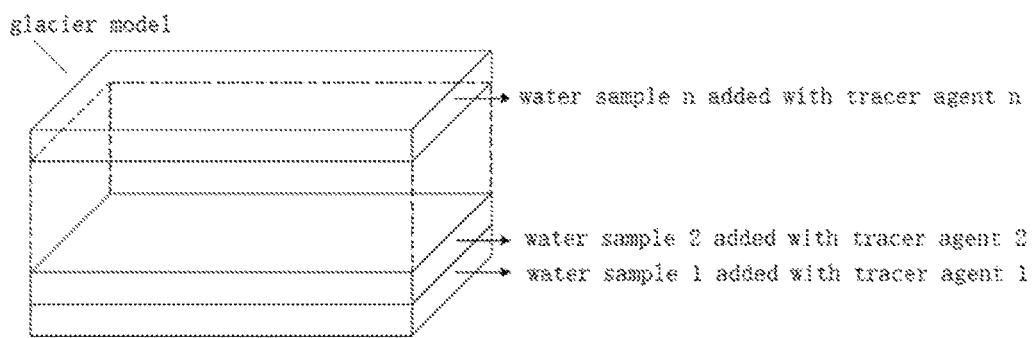

METHOD FOR DETECTING GLACIER MELTING BASED ON TRACER TECHNOLOGY

CROSS REFERENCE TO RELATED APPLICATIONS

This application is the national phase entry of International Application No. PCT/CN2017/096418, filed on Aug. 8, 2017, which claims priority to Chinese patent application no. 201610665895.X filed on Aug. 12, 2016, the entire contents of which are incorporated herein by reference.

TECHNICAL FIELD

The present invention relates to a method for detecting glacier melting based on tracer technology.

BACKGROUND

According to the latest statistics of "World Glacier Inventory" and "Glacier Inventory of China", the glaciers cover an area of 15,865,756 km² globally, wherein 96.6% of the glaciers are located in the Antarctica and Greenland, followed by North America (1.7%) and Asia (1.2%). Glaciers are closely related to the activities of human being. The changes of advance and retreat of the glaciers has a much closer relationship with the people who live in the mountain regions.

Glaciers are the indicator of the climate changes. Under the trend of global warming, glaciers tend to accelerate in retreat. The speeding up of the glacier melting has a great influence on the sea level rise, local water circulation, and water resources accessibility. Nowadays, methods of researching the variation of the glacier storage (volume) mainly include the traditional measurement method, the statistical formula method, glacier topographic survey, and remote sensing monitoring. However, these methods are all based on the research of the variation of the glacier storage (volume), without discussing the principle of melting based on the physical process of the glacier melting. Moreover, most research methods are time-consuming, costly, laborious, and prone to be limited by field conditions. The present invention relates to the ice melting tests under laboratory conditions. Thus, the present invention is simple, practical, time-saving, and labor-saving, with reliable and accurate results.

The melting of ice is a common physical phenomenon in nature and is a heat transfer process in an unstable state. Moreover, the phase transition occurs along with the melting process. There are a lot of factors that affect the rate of ice melting. Intuitively speaking, main factors are the temperature, the airflow, the humidity in the ambient environment, the surface area of the ice, the pressure impacted on the ice (air pressure or solid pressure), the impurity in the ice, etc.

Manners of the glacier melting include the melting on the ice surface, the melting inside the ice, and the melting under the ice. Among others, the melting on the ice surface happens most of the time. The study of the glacier melting is an important way to analyze and predict the advance and retreat of the glacier. The study is also the basis to understand the feeding condition of the river, to exploit and utilize the glacier resources. By the quantitative simulation of the processes of runoff (melting) and confluence of the glacier region, a theoretical basis can be provided for the management of the variation of water resource of the glacier, glacier flood control, glacier hydroenergy utilization, etc. In addition, the quantitative simulation is critical for glacier kinetic study, including the understanding of the water flow motion inside the glacier, the distribution of pressure inside the glacier, the sliding and jumping of the glacier, the debris of the broken glacial lake, etc. The quantitative evaluation of the variation of the glacier is critical to the management of water resources in the arid region or arid drainage basin, the rising of the sea level, and the prevention of natural disasters caused by glacier.

SUMMARY

The purpose of the present invention is to provide a method for detecting glacier melting based on tracer technology. The process of the glacier melting is simulated by establishing a glacier model. Further, the actual melting rate of the glacier is deduced. The error of calculated result is small. The operation is easy.

To solve the above technical problems, the present invention provides a method for detecting glacier melting based on tracer technology, which includes:

1. Different tracer agents with equal concentration are respectively added into a plurality of water samples. The water sample and the tracer agent are mixed well. Meanwhile, the volume and the mass of each glacier model are recorded. A plurality of water samples added with tracer agents are frozen layer by layer from inside to outside to establish a plurality of glacier models.

2. The surrounding environmental factors of the glacier model are adjusted. Water samples of the glacier models melted under different environmental factors are collected. Furthermore, the concentrations of different kinds of tracer agents in the water samples are measured.

3. According to the content of the tracer agent, the mass, the melting rate, and the melting location of the water sample melted in different ice layers of the glacier model under different conditions are obtained. Moreover, the actual physical process of the glacier melting is deduced according to the melting rate, the melting mass, and the melting location.

Further, environmental factors include temperature, pressure, and airflow.

Further, the specific calculation method of the mass of the water sample $\Delta m_i$ and the volume of the water sample $\Delta V_i$ melted in each ice layer of the glacier model under different conditions is:

$$\Delta m_i = \Delta m * \Delta C_i / \Delta C$$

$$\Delta V_i = \Delta m_i / g$$

In the formulas, $\Delta m_i$ is the mass of the water sample melted in each ice layer of the glacier model. $\Delta m$ is the total mass of the water sample melted in the glacier model. $\Delta C_i$ is the concentration of the tracer agent in the water sample melted in each ice layer of the glacier model. $\Delta C$ is the sum of the concentration of the tracer agent in the water sample. $\Delta V_i$ is the volume of each ice layer of the glacier model. g is the density of the glacier model.

Further, the specific calculation method of the melting rate $v_i$ of each ice layer of the glacier model under different conditions is:

$$v_i = \Delta V_i / t$$

In the formula, $v_i$ is the melting rate of each ice layer of the glacier model. $\Delta V_i$ is the volume of each ice layer of the glacier model. t is the melting time of the glacier model.

Further, the specific calculation method of the actual melting rate of the glacier $v_{actual}$ is:

$$a_{actual} = \Sigma(dv_i/d\Delta V_i)/n*$$

$$v_{actual} = a_{actual} * V_{actual}$$

In the formulas, $a_{actual}$ is the average variation of melting rate of the glacier model. $dv_i/d\Delta V_i$ is the variation of the melting rate of each ice layer of the glacier model. $v_{actual}$ is the actual melting rate of the glacier. $dv_i$ is the partial melting rate of each ice layer. $V_{actual}$ is the actual volume of the glacier.

Advantages of the present invention are as follows. By establishing the glacier model, the present application can calculate the actual melting rate of the glacier. Further, the monitoring of actual melting of the glacier can be realized. Moreover, by measuring the content of the tracer agent in the water sample, the present application has deduced melting rates of the ice with different volumes. Moreover, through the melting rates of the ice with different volumes, the average variation of the melting rate of the glacier model is obtained. Finally, according to the average variation of the melting rate of the glacier model, the melting rate of the glacier with different volumes is deduced. The melting rate of the glacier obtained by this method is highly accurate. The melting rate of the glacier with different volumes can be calculated accurately.

BRIEF DESCRIPTION OF THE DRAWINGS

FIG. 1 is a schematic diagram of a structure of the glacier model provided by the embodiment of the present invention.

DETAILED DESCRIPTION

Hereinafter, embodiments of the present invention are described, such that a person skilled in the art can understand the present invention. However, it should be noted that the present invention is not limited by the scope of the embodiments. For a person skilled in the art, as long as the variations are within the spirit and scope of the present invention defined or determined by the appending claims, such variations are obvious. All the inventions using the concept of the present invention fall within the protection scope.

A method for detecting glacier melting based on tracer technology is provided.

Embodiment 1 the method includes the following steps:

Step 1: Different tracer agents with an equal concentration are respectively added into a plurality of water samples. The water sample and the tracer agent are mixed well. Meanwhile, the volume and the mass of each glacier model are recorded. As shown in FIG. 1, a plurality of water samples added with tracer agents are frozen layer by layer from inside to outside to establish a plurality of glacier models.

Step 2: The surrounding environmental factors of the glacier models are adjusted. Water samples of the glacier models melted under different environmental conditions are collected. Furthermore, the concentrations of different kinds of tracer agents in the water samples are measured.

Step 3: According to the contents of the tracer agents, the mass, the melting rate, and the melting location of the water samples melted in different ice layers of the glacier model under different conditions are obtained. Moreover, the actual physical process of the glacier melting is deduced according to the melting rate, the melting mass, and the melting location.

Embodiment 2

Environmental factors mentioned in Embodiment 1 specifically refer to the temperature, the pressure, and the airflow.

Embodiment 3

The specific calculation method of the mass of the water sample $\Delta m_I$ and the volume of the water sample $\Delta V_i$ melted in each ice layer of the glacier model under different conditions in Embodiment 1 is:

$$\Delta m_i = \Delta m * \Delta C_i/\Delta C$$

$$\Delta V_i = \Delta m_i/g$$

In the formulas, $\Delta m_i$ is the mass of the water sample melted in each ice layer of the glacier model. $\Delta m$ is the total mass of the water sample melted in the glacier model. $\Delta c_i$ is the concentration of the tracer agent in the water sample melted in each ice layer of the glacier model. $\Delta c$ is the sum of the concentrations of the tracer agents in the water samples. $\Delta v_i$ is the volume of each ice layer of the glacier model. g is the density of the glacier model.

Embodiment 4

With the volume of each ice layer of the glacier model in Embodiment 3, the melting rate of each ice layer $v_i$ of the glacier model under different conditions can be obtained. The specific calculation method is:

$$v_i = \Delta V_i/t$$

In the formula, $v_i$ is the melting rate of each ice layer of the glacier model. $\Delta V_i$ is the volume of each ice layer of the glacier model. t is the melting time of the glacier model.

Embodiment 5

With the melting rate of each ice layer of the glacier model in Embodiment 4, the actual melting rate of the glacier $v_{actual}$ can be obtained. The specific calculation method is:

$$a_{actual} = \Sigma(dv_i/d\Delta V_i)/n*$$

$$v_{actual} = a_{actual} * V_{actual}$$

In the formulas, $a_{actual}$ is the average variation of the melting rate of the glacier model. $dv_i/d\Delta V_i$ is the variation of the melting rate of each ice layer of the glacier model. $v_{actual}$ is the actual melting rate of the glacier. $dv_i$ is the partial melting rate of each ice layer. $V_{actual}$ is the actual volume of the glacier.

What is claimed is:

1. A method for detecting glacier melting based on a tracer technology, comprising:
   constructing one or more glacier models by adding a plurality of tracer agents with an equal concentration respectively into a plurality of first water samples;
   mixing each first water sample and each tracer agent well;
   recording a volume and a mass of each glacier model;
   freezing a plurality of first water samples added with tracer agents layer by layer from inside to outside to establish each of the plurality of glacier models;

under laboratory conditions, adjusting surrounding environmental factors of the glacier models:

collecting second water samples of the glacier models melted under the different environmental conditions;

measuring concentrations of the plurality of tracer agents in the second water samples;

obtaining a mass, a melting rate, and a melting location of each second water sample melted in different ice layers of the glacier models wider different conditions according to a content of each tracer agent; and deducing an actual physical process of the glacier melting according to the melting rate, a melting mass, and the melting location.

2. The method for detecting glacier melting based on the tracer technology of claim 1, wherein a specific calculation method of the mass of the each second water sample $\Delta m_i$ and the a volume of the each second water sample $\Delta V_i$ melted in each ice layer of the glacier model under different conditions is $$\Delta m_i = \Delta m * \Delta C_i / \Delta C$$

$$\Delta V_i = \Delta m_i / g$$

wherein, $\Delta m_i$ is the mass of each of the second water samples melted in each ice layer of the glacier model, $\Delta m$ is a total mass of each of the second water sample melted in the glacier model, $\Delta C_i$ is the a concentration of each of the tracer agents in each of the second water samples melted in each ice layer of the glacier model, $\Delta C$ is a sum of the concentrations of the plurality of tracer agents in the second water samples, $\Delta V_i$ is a volume of each ice layer of the glacier model, and g is a density of the glacier model.

3. The method for detecting glacier melting based on the tracer technology of claim 2, wherein a specific calculation method of the melting rate $v_i$ of each ice layer of the glacier model under different conditions is $$v_i = \Delta V_i / t$$

wherein, $v_i$ is the melting rate of each ice layer of the glacier model, $\Delta V_i$ is the volume of each ice layer of the glacier model, and t is melting time of the glacier model.

4. The method for detecting glacier melting based on the tracer technology of claim 3, wherein a specific calculation method of an average variation of the melting rate $a_{actual}$ and a specific calculation method of an actual melting rate of a glacier $v_{actual}$ is $$a_{actual} = \Sigma(dv_i/d\Delta V_i)/n*$$

$$v_{actual} = a_{actual} * V_{actual}$$

wherein, $a_{actual}$ is the average variation of the melting rate of the glacier model, $dv_i/d\Delta V_i$ is a variation of the melting rate of each ice layer of the glacier model, $v_{actual}$ is the actual melting rate of the glacier, $dv_i$ is a partial melting rate of each ice layer, and $V_{actual}$ is an actual volume of the glacier.

5. The method for detecting glacier melting based on the tracer technology of claim 1, wherein the surrounding environmental factors are temperature, pressure and airflow.

* * * * *